(12) United States Patent
Harada et al.

(10) Patent No.: US 9,739,175 B2
(45) Date of Patent: Aug. 22, 2017

(54) MOLDED PART

(71) Applicants: IHI Corporation, Tokyo (JP); IHI AEROSPACE CO., LTD., Tokyo (JP)

(72) Inventors: Takashi Harada, Tokyo (JP); Yu Shigenari, Tokyo (JP); Koichi Inagaki, Tokyo (JP); Agamu Tanaka, Tokyo (JP); Tadahiro Ishigure, Tokyo (JP)

(73) Assignees: IHI Corporation, Tokyo (JP); IHI AEROSPACE CO., LTD., Tokyo (JP)

( * ) Notice: Subject to any disclaimer, the term of this patent is extended or adjusted under 35 U.S.C. 154(b) by 938 days.

(21) Appl. No.: 14/057,734

(22) Filed: Oct. 18, 2013

(65) Prior Publication Data

US 2014/0044539 A1 Feb. 13, 2014

Related U.S. Application Data

(63) Continuation of application No. PCT/JP2012/061105, filed on Apr. 25, 2012.

(30) Foreign Application Priority Data

Apr. 26, 2011 (JP) ................................. 2011-098337

(51) Int. Cl.
*F01D 25/24* (2006.01)
*F01D 9/02* (2006.01)
(Continued)

(52) U.S. Cl.
CPC .......... *F01D 25/243* (2013.01); *B29C 65/562* (2013.01); *B29C 66/1312* (2013.01);
(Continued)

(58) Field of Classification Search
CPC .... F01D 25/243; F01D 9/02; F05D 2300/603; F16B 5/02; B29C 65/562; B29C 66/543;
(Continued)

(56) References Cited

U.S. PATENT DOCUMENTS 4,074,914 A * 2/1978 Novotny ............... F01D 25/243
285/405
4,892,462 A 1/1990 Barbier et al.
(Continued)

FOREIGN PATENT DOCUMENTS

CN  88 1 03525 A  12/1988
CN  1070928 A  4/1993
(Continued)

OTHER PUBLICATIONS

Combined Office Action and Search Report issued Mar. 2, 2015 in Chinese Patent Application No. 201280019932.X (with English language translation and English translation of categories of cited documents).
(Continued)

*Primary Examiner* — Dwayne J White
*Assistant Examiner* — Aaron R Eastman
(74) *Attorney, Agent, or Firm* — Oblon, McClelland, Maier & Neustadt, L.L.P.

(57) ABSTRACT

An additional pad 27 is additionally and integrally arranged from an outer surface of a flange 17 opposite to a contacting side of the flange 17 to a small-diameter curved surface of a bend 19 and from there to an end of an outer surface of a part body 13. On an outer surface side of the additional pad 27, a fastening seat 27f is formed by machining. An area end PAe of a processed area PA formed by machining is positioned on the part body 13 beyond the bend 19.

3 Claims, 5 Drawing Sheets

(51) Int. Cl.
*F02K 3/06* (2006.01)
*B29C 65/56* (2006.01)
*B29C 65/00* (2006.01)
B29L 31/00 (2006.01)
F16B 5/02 (2006.01)

(52) U.S. Cl.
CPC .......... *B29C 66/543* (2013.01); *B29C 66/721* (2013.01); *F01D 9/02* (2013.01); *F02K 3/06* (2013.01); *B29C 66/71* (2013.01); *B29C 66/7212* (2013.01); *B29C 66/72141* (2013.01); *B29C 66/73921* (2013.01); *B29C 66/73941* (2013.01); *B29L 2031/7504* (2013.01); *F05D 2300/603* (2013.01); *F16B 5/02* (2013.01); *Y02T 50/672* (2013.01)

(58) Field of Classification Search
CPC .............. B29C 66/721; B29C 66/7212; B29C 66/72141; B29C 66/73921; F02K 3/06; B29L 2031/7504
USPC ....................................................... 415/200
See application file for complete search history.

(56) References Cited

U.S. PATENT DOCUMENTS

| | | | | |
|---|---|---|---|---|
| 5,063,661 | A * | 11/1991 | Lindsay | F01D 25/24 29/405 |
| 6,305,899 | B1 * | 10/2001 | Saunders | F01D 21/045 415/214.1 |
| 6,352,404 | B1 * | 3/2002 | Czachor | F01D 25/243 415/116 |
| 7,871,486 | B2 | 1/2011 | Xie et al. | |
| 8,475,895 | B2 | 7/2013 | Xie | |
| 8,646,723 | B2 * | 2/2014 | Porte | B64D 29/06 181/214 |
| 9,140,135 | B2 * | 9/2015 | Robertson, Jr. | F01D 21/045 |
| 2004/0037641 | A1 * | 2/2004 | Wagner | F01D 5/066 403/408.1 |
| 2005/0204746 | A1 * | 9/2005 | Chereau | F01D 25/243 60/796 |
| 2007/0086854 | A1 * | 4/2007 | Blanton | B29C 65/562 403/338 |
| 2008/0060755 | A1 | 3/2008 | Blanton et al. | |
| 2008/0118683 | A1 | 5/2008 | Xie et al. | |
| 2008/0145215 | A1 * | 6/2008 | Finn | F01D 21/045 415/200 |
| 2009/0001672 | A1 * | 1/2009 | Takahashi | F16J 15/0818 277/595 |
| 2010/0000227 | A1 | 1/2010 | Porte et al. | |

FOREIGN PATENT DOCUMENTS

| | | |
|---|---|---|
| CN | 101437668 A | 5/2009 |
| EP | 1 777 377 A2 | 4/2007 |
| EP | 2 434 105 A2 | 3/2012 |
| JP | 7-9481 | 1/1995 |
| JP | 8-290480 | 11/1996 |
| JP | 2000-117844 | 4/2000 |
| JP | 2008-68626 | 3/2008 |
| JP | 2008-128249 | 6/2008 |

OTHER PUBLICATIONS

International Search Report issued on Jun. 5, 2012 for PCT/JP2012/061105 filed on Apr. 25, 2012 with English Translation.
International Written Opinion issued on Jun. 5, 2012 for PCT/JP2012/061105 filed on Apr. 25, 2012.
Extended European Search Report issued Sep. 10, 2014 in Patent Application No. 12777801.7.

* cited by examiner

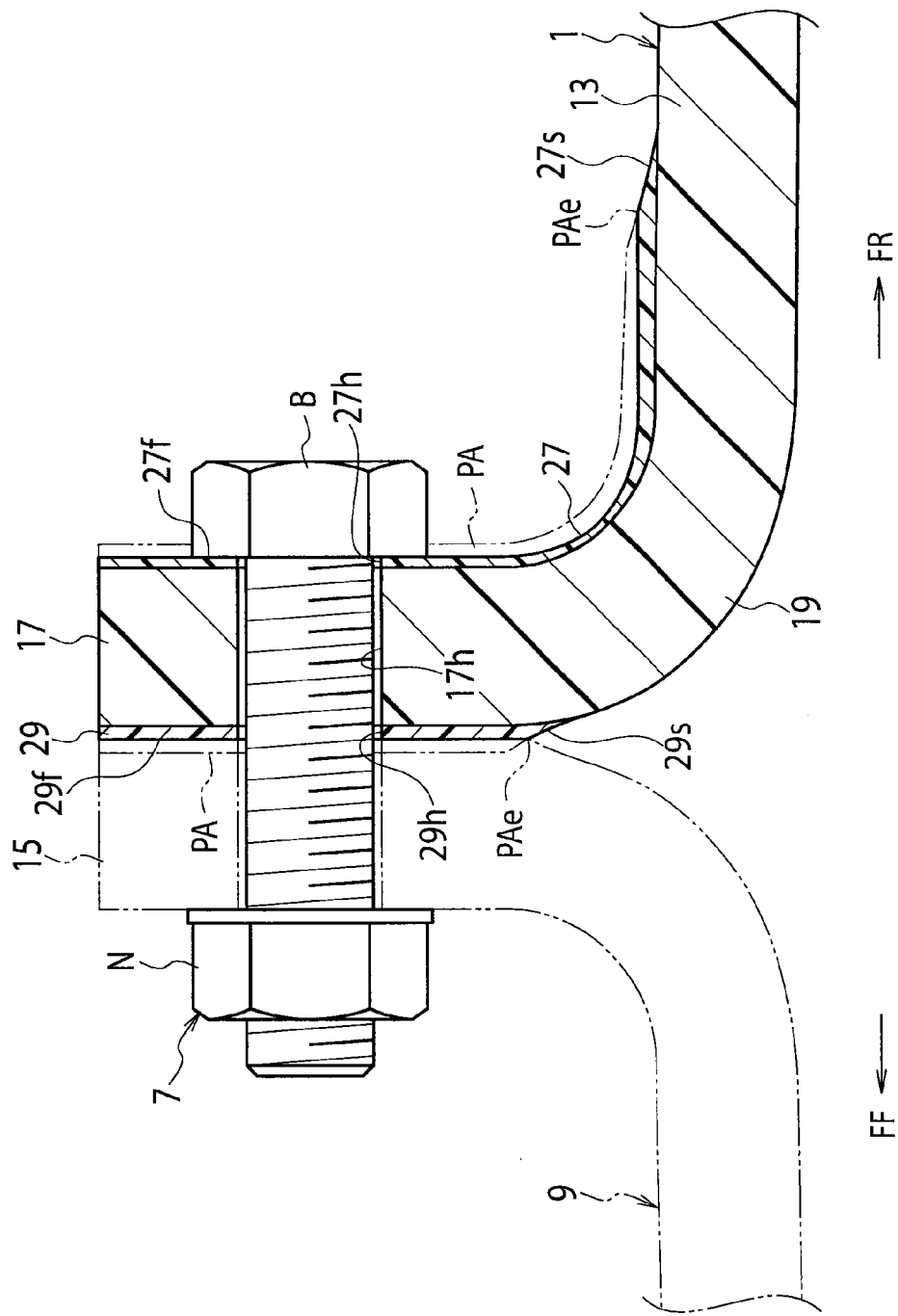

MOLDED PART

CROSS REFERENCE TO RELATED APPLICATION

This application is a Continuation of PCT Application No. PCT/JP2012/061105, filed on Apr. 25, 2012, and based upon and claiming the benefit of priority from prior Japanese Patent Application No. 2011-098337, filed Apr. 26, 2011, the entire contents of all of which are incorporated herein by reference.

TECHNICAL FIELD

The present invention relates to a molded part such as a fan case used for an aircraft engine, capable of being fastened to a counterpart with a fastener in a state contacting with the counterpart.

BACKGROUND ART

A fan case used for an aircraft engine will briefly be explained.

The fan case is to cover a plurality of fan blades in the aircraft engine and is generally made of metallic material such as titanium alloy. The fan case is able to be fastened to a counterpart with fasteners including fastening bolts and nuts in a state contacting with the counterpart.

As shown in FIG. 4, the fan case has a cylindrical case body 120 as a part body. The case body 120 extends in the direction of a case axis. At least at one end of the case body 120, there is integrally formed a flange 110 through a bend 115 so that the flange is able to be brought into contact with the counterpart. The flange 110 has an insertion hole 112 into which a fastener (fastening bolt) is insertable. On an outer surface of the flange 110 opposite to the counterpart contacting side, there is formed by machining a flat fastening seat 111 that is orthogonal to an outer circumferential surface of the case body 120. The fastening seat 111 is able to support part of the fastener, i.e., the head of a fastening bolt or the bottom surface of a nut. To sufficiently secure fastening strength between the fan case and the counterpart, the center of the insertion hole 112 of the flange 110, i.e., the center of the fastening seat 111 is so set not to be largely separated away from the outer circumferential surface of the case body 120 as illustrated in FIG. 4. Due to this, an area end (area terminal) 114 of a processed area 113 is positioned on a small-diameter curved surface of the bend 115. A related art concerning the present invention is, for example, U.S. Patent Publication No. 2008-011868.

SUMMARY OF INVENTION

Problems to be Solved by Invention

In the field of aircraft engines, composite material (FRP) containing thermosetting or thermoplastic resin and reinforcing fibers is attracting attention as material of light weight and high strength. Attempts have been made to adopt FRP as material to form a fan case.

A fastening surface of the flange 110 is fastened with bolts, and therefore, is required to have predetermined surface conditions defined with perpendicularity with respect to an engine axis, flatness, surface roughness, and the like. A flange made of forged metal or molded composite material hardly satisfies as it is such surface conditions, and therefore, must further be processed by machining.

In the case of a flange made of composite material, the machining causes a problem of cutting fibers of the material. The composite material employs a fiber structure to secure rigidity and strength, and if the fibers are cut, greatly deteriorates strength and the like.

To secure an assembling accuracy between the fan case and the counterpart, fastening part of the fan case is finished by machining. For the fan case made of FRP, an ultrasonic flaw inspection is carried out with an ultrasonic transducer (ultrasonic probe) 130 after a finishing process. This is necessary to confirm if there is an internal defect such as delamination caused by machining.

The flange part having curved layers easily causes stress concentration, and therefore, is an important location for a delamination inspection. The ultrasonic inspection emits sonic waves toward an object and measures transmitted or reflected sonic waves. If the surface of the object has steps or discontinuities at this time, the sonic waves scatter to hinder a correct measurement.

This will be explained in more detail. As illustrated in FIG. 4, the area end 114 of the processed area 113 is positioned on the small-diameter curved surface of the bend 115. In this case, the area end 114 of the processed area 113 easily forms a machined step (mismatched pattern) with respect to a smooth surface, i.e., the small-diameter curved surface of the bend 115. This causes a problem of scattering reflected waves of ultrasonic waves USW emitted from the ultrasonic transducer 130 toward the bend 115. As a result, the inspection accuracy of an ultrasonic flaw inspection carried out on the fan cease is not secured at a high level.

The above-mentioned problem will occur not only on the fan case made of FRP but also on various molded parts made of FRP.

The present invention is capable of providing a molded part that does not lower the strength of fibers of composite material and allows a highly accurate ultrasonic inspection to be carried out.

Means to Solve Problems

According to a technical aspect of the present invention, there is provided a molded part (laminated part) made of a composite material of thermosetting or thermoplastic resin and reinforcing fibers and capable of being fastened to a counterpart with a fastener in a state contacting with the counterpart. The molded part includes a part body, a flange that is integrally formed at least at one end of the part body through a bend, is provided with an insertion hole into which the fastener is insertable, and is able to be brought into contact with the counterpart, and an additional pad that is additionally and integrally arranged from an outer surface (fastening seat side) of the flange opposite to a contacting side of the flange to a small-diameter curved surface of the bend and from there to one end of an outer surface of the part body and is provided with a through hole aligning with the insertion hole of the flange to allow an insertion of the fastener. A fastening seat is formed by machining on an outer surface side of the additional pad and is able to support part of the fastener, perpendicular to the outer surface of the part body, and flat and in that an area end (area terminal) of a processed area formed by machining on the additional pad is positioned on the part body beyond the bend.

The term "molded part" is not limited to the fan case of an aircraft engine but it may be any molded part made of a composite material containing thermosetting or thermoplastic resin and reinforcing fibers.

BRIEF DESCRIPTION OF DRAWINGS

FIG. 1A is an enlarged view of an arrowed part IA of FIG. 2.

MODE OF IMPLEMENTING INVENTION

Figure 1B:
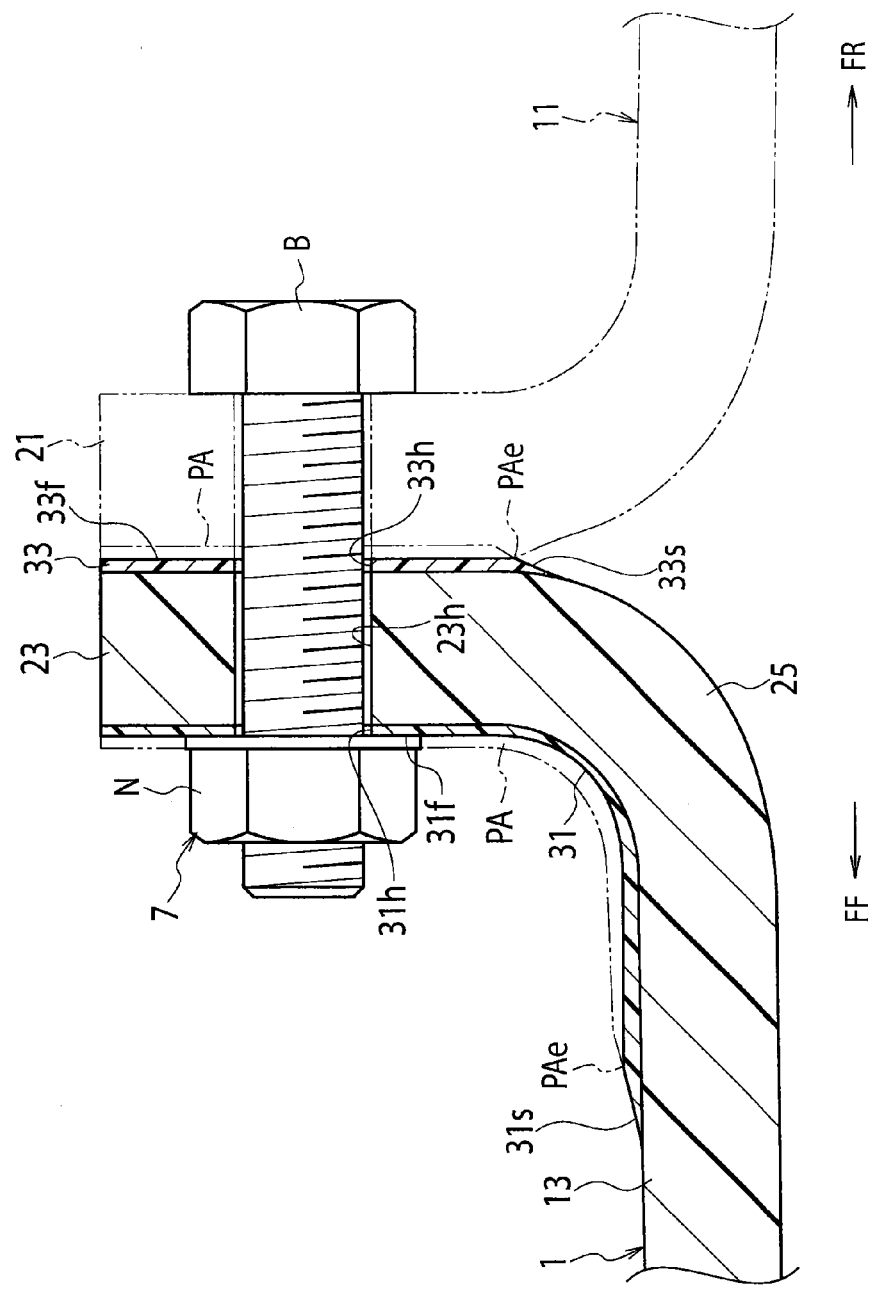
FIG. 1B is an enlarged view of an arrowed part IB of FIG. 2.

An embodiment of the present invention will be explained with reference to FIGS. 1A, 1B, 2, and 3. In the drawings, "FF" means a front direction and "FR" means a rear direction.

Figure 2:
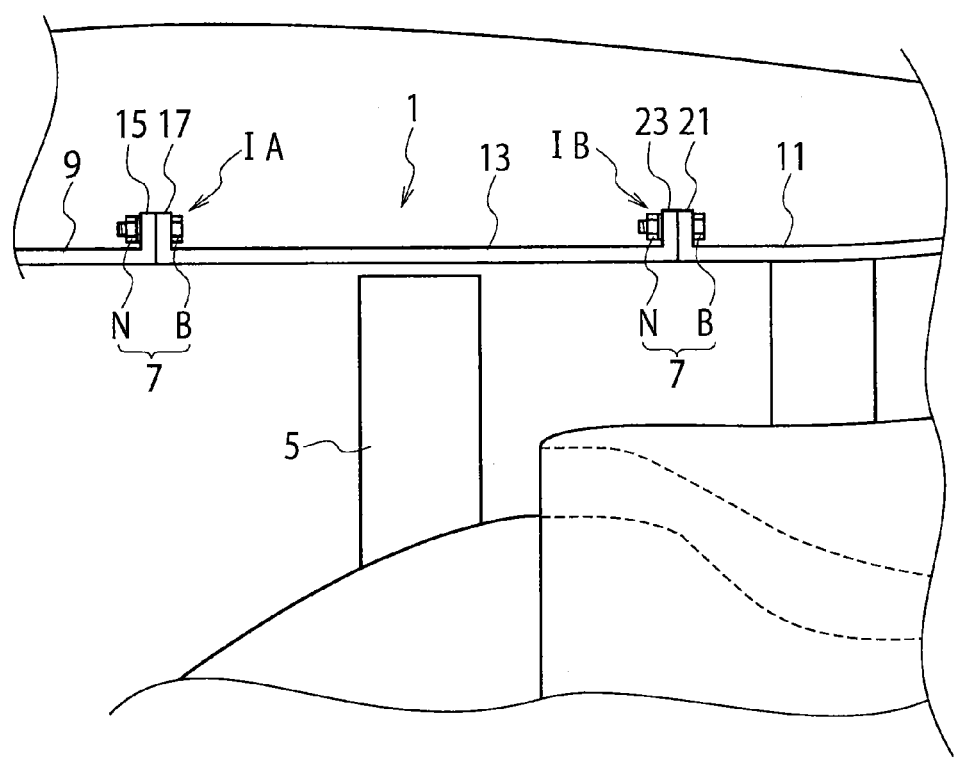
FIG. 2 is an enlarged view of an arrowed part II of FIG. 3.
Figure 3:
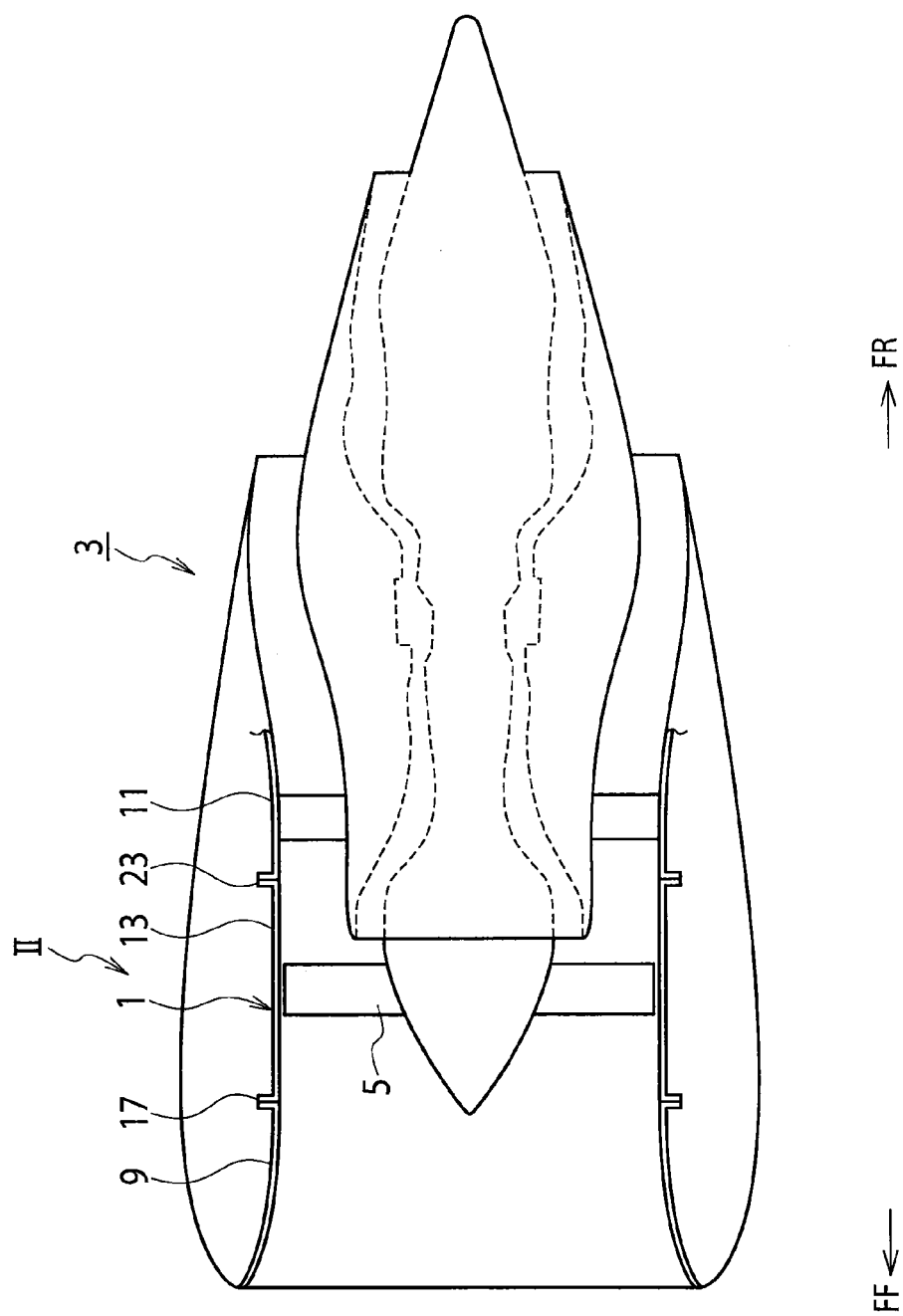
FIG. 3 is a schematic sectional view of an aircraft engine.

As illustrated in FIGS. 2 and 3, a cylindrical fan case 1 according to an embodiment of the present invention is used for an aircraft engine 3 to cover a plurality of fan blades 5 in the aircraft engine 3 and is made of a composite material (FRP) of thermosetting or thermoplastic resin and reinforcing fibers.

The fan case 1 is brought into contact with an engine cowl 9 (as an example of a counterpart) and a rear case 11 (as an example of a counterpart) and is fastened thereto with a plurality of fasteners 7 including fastening bolts B and nuts N.

The fan case 1 has a cylindrical case body 13 as a part body. The case body 13 extends in the direction of a case axis (front-rear direction). At a front end (one end) of the case body 13, an annular front flange 17 is integrally formed from a front bend 19 so that the front flange 17 is able to be brought into contact with a counter flange 15 of the engine cowl 9. The front flange 17 has a plurality of (only one is illustrated) front insertion holes 17h formed at intervals in a circumferential direction to insert the fastening bolts B.

At a rear end (the other end) of the case body 13, an annular rear flange 23 is integrally formed from a rear bend 25 so that the rear flange 23 is able to be brought into contact with a counter flange 21 of the rear case 11. The rear flange 23 has a plurality of (only one is illustrated) rear insertion holes 23h formed at intervals in a circumferential direction to insert the fastening bolts B.

The case body 13, front flange 17, front bend 19, rear flange 23, and rear bend 25 are made of a composite material of thermosetting resin such as epoxy resin, phenol resin, or polyimide resin and carbon fibers (an example of reinforcing fibers). In more detail, it is formed from a thermosetting-resin-impregnated common carbon fiber fabric (not illustrated) and a roving (not illustrated). Instead of the composite material of thermosetting resin and carbon fibers, the case body 13 and the like may be made of a composite material of thermoplastic resin such as polyether ether ketone, polyphenylene sulfide, or the like and carbon fibers.

As illustrated in FIGS. 1A and 2, an annular first front additional pad 27 is additionally and integrally arranged from an outer surface of the front flange 17 opposite to a contacting side of the front flange 17 to a small-diameter curved surface of the front bend 19 and from there to a front end side of the case body 13. Formed at an end (end face) of the first front additional pad 27 on the case body 13 side is a first front slope 27s that gradually thins toward a front end thereof.

The first front additional pad 27 has a plurality of (only one is illustrated) first front through holes 27h formed at intervals in a circumferential direction to insert the fastening bolts B. The first front through holes 27h align with the corresponding front insertion holes 17h, respectively. Formed by machining on the outer surface side of the first front additional pad 27 is an annular flat front fastening seat 27f. The front fastening seat 27f is able to support a head of the fastening bolt B and is perpendicular to the outer surface of the case body 13.

A processed area PA is formed by machining on the outer surface side of the first front additional pad 27. The processed area PA distributes from an end face of the first front additional pad 27 on the front flange 17 side up to an end face of the pad 27 on the case body 13 side. An area end (area terminal) PAe of the processed area PA is positioned on the case body 13 beyond the front bend 19.

An annular (disk-like) second front additional pad 29 is additionally and integrally arranged on an outer surface on the contacting side of the front flange 17. Formed at an end (end face) of the second front additional pad 29 on the case body 13 side is a second front slope 29s that gradually thins toward a front end thereof.

The second front additional pad 29 has a plurality of second front through holes 29h formed at intervals in a circumferential direction to insert the fastening bolts B. The second front through holes 29h align with the corresponding front insertion holes 17h, respectively. An annular flat front contacting surface 29f is formed by machining on an outer surface side of the second front additional pad 29. The front contacting surface 29f is able to be brought into contact with the counter flange 15 of the engine cowl 9 and is perpendicular to the outer surface of the case body 13.

A processed area PA is formed by machining on the outer surface side of the second front additional pad 29. The processed area PA distributes from an end face of the second front additional pad 29 on the front flange 17 side to an end face of the pad 29 on the case body 13 side. An area end PAe of the processed area Pa is positioned in front of the front bend 19.

Similarly, as illustrated in FIGS. 1B and 2, an annular first rear additional pad 31 is additionally and integrally arranged from an outer surface of the rear flange 23 opposite to a contacting side of the rear flange 23 to a small-diameter curved surface of the rear bend 25 and from there to a rear end side of the case body 13. Formed at an end (end face) of the first rear additional pad 31 on the case body 13 side is a first rear slope 31s that gradually thins toward a front end thereof.

The first rear additional pad 31 has a plurality of first rear through holes 31h formed at intervals in a circumferential direction to insert the fastening bolts B. The first rear through holes 31h align with the corresponding rear insertion holes 23h, respectively.

An annular flat rear fastening seat 31f is formed by machining on an outer surface side of the first rear additional pad 31. The rear fastening seat 31f is able to support a bottom surface of the nut N and is perpendicular to the outer surface of the case body 13. Formed by machining on the outer surface side of the first rear additional pad 31 is a processed area PA. The processed area PA distributes from an end face of the first rear additional pad 31 on the rear flange 23 side up to an end face of the pad 31 on the case body 13 side. An area end PAe of the processed area PA is positioned on the case body 13 beyond the rear bend 25.

An annular (disk-like) second rear additional pad 33 is additionally and integrally arranged on an outer surface on a contacting side of the rear flange 23. Formed at an end (end face) of the second rear additional pad 33 on the case body 13 side is a second rear slope 33s that gradually thins toward a front end thereof.

The second rear additional pad 33 has a plurality of second rear through holes 33h formed at intervals in a circumferential direction to insert the fastening bolts B. The second rear through holes 33h align with the corresponding rear insertion holes 23h, respectively. On an outer surface side of the second rear additional pad 33, an annular flat rear contacting surfaces 33f are surface 33f is formed by machining. The rear contacting surfaces 33f are able to be brought into contact with the counter flange 21 of the rear case 11 and are perpendicular to the outer surface of the case body 13.

A processed area PA is formed by machining on the outer surface side of the second rear additional pad 33. The processed area PA distributes from an end face of the second rear additional pad 33 on the rear flange 23 side to an end face of the pad 33 on the case body 13 side. An area end PAe of the processed area Pa is positioned in front of the rear bend 25.

The first front additional pad 27, second front additional pad 29, first rear additional pad 31, and second rear additional pad 33 are made of a composite material of thermosetting resin such as epoxy resin, phenol resin, or polyimide resin and glass fibers (an example of reinforcing fibers). More precisely, it is formed from a thermosetting-resin-impregnated glass fiber fabric (not illustrated). GFRP (glass fiber reinforced plastics) is easy to process and easy to carry out a postprocess inspection compared with CFRP (carbon fiber reinforced plastic) and causes no electric corrosion by electric conduction to bolts.

Instead of the composite material of thermosetting resin and glass fibers, the first front additional pad 27 and the like may be made of a composite material of thermoplastic resin such as polyether ether ketone, polyphenylene sulfide, or the like and glass fibers.

In this way, the annular first front additional pad 27 is additionally and integrally arranged from the outer surface of the front flange 17 opposite to the contacting side of the front flange 17 and from there to the front end side of the case body 13. On the outer surface side of the first front additional pad 27, the plurality of annular flat front fastening seats 27f are formed by machining. The annular second front additional pad 29 is additionally and integrally arranged on the contacting side of the front flange 17. On the outer surface side of the second front additional pad 29, the plurality of flat front contacting surfaces 29f are formed by machining. As a result, machining on the case body 13, front flange 17, and front bend 19 themselves can be nearly eliminated or minimized when finishing the fan case 1.

Similarly, the annular first rear additional pad 31 is additionally and integrally arranged from the outer surface of the rear flange 23 opposite to the contacting side of the rear flange 23 to the rear end side of the case body 13. On the outer surface side of the first rear additional pad 31, the plurality of annular flat rear fastening seats 31f are formed by machining. The annular second rear additional pad 33 is additionally and integrally arranged on the contacting side of the rear flange 23. On the outer surface side of the second rear additional pad 33, the plurality of annular flat rear contacting surfaces 33f are formed by machining. As a result, machining on the rear flange 23 and rear bend 25 themselves can be mostly eliminated or minimized when finishing the fan case 1.

The flat front fastening seat 27f is formed by machining on the outer surface side of the first front additional pad 27. On the outer surface side of the first front additional pad 27, the processed area PA is formed by machining. The area end PAe of the processed area PA is positioned on the case body 13 beyond the front bend 19. Accordingly, no stress concentrates on specific locations, and when finishing the fan case 1 into a final shape by machining, a risk of causing machined steps (mismatched patterns) at the front side (front bend 19 side) of the fan case 1 is minimized. In particular, the first front slope 27s formed at an end of the first front additional pad 27 on the case body 13 side is able to further disperse stress to nearly zero the occurrence of machined steps at the front side of the fan case 1.

Similarly, the annular flat rear fastening seat 31f is formed by machining on the outer surface side of the first rear additional pad 31. On the outer surface side of the first rear additional pad 31, the processed area PA is formed by machining. The area end PAe of the processed area PA is positioned on the case body 13 beyond the rear bend 25. This minimizes a risk of causing machined steps at the rear side (the rear bend 25 side) of the fan case 1. In particular, the first rear slope 31s formed at an end of the first rear additional pad 31 on the case body 13 side is able to nearly zero the occurrence of machined steps at the rear side part of the fan case 1.

Figure 4:
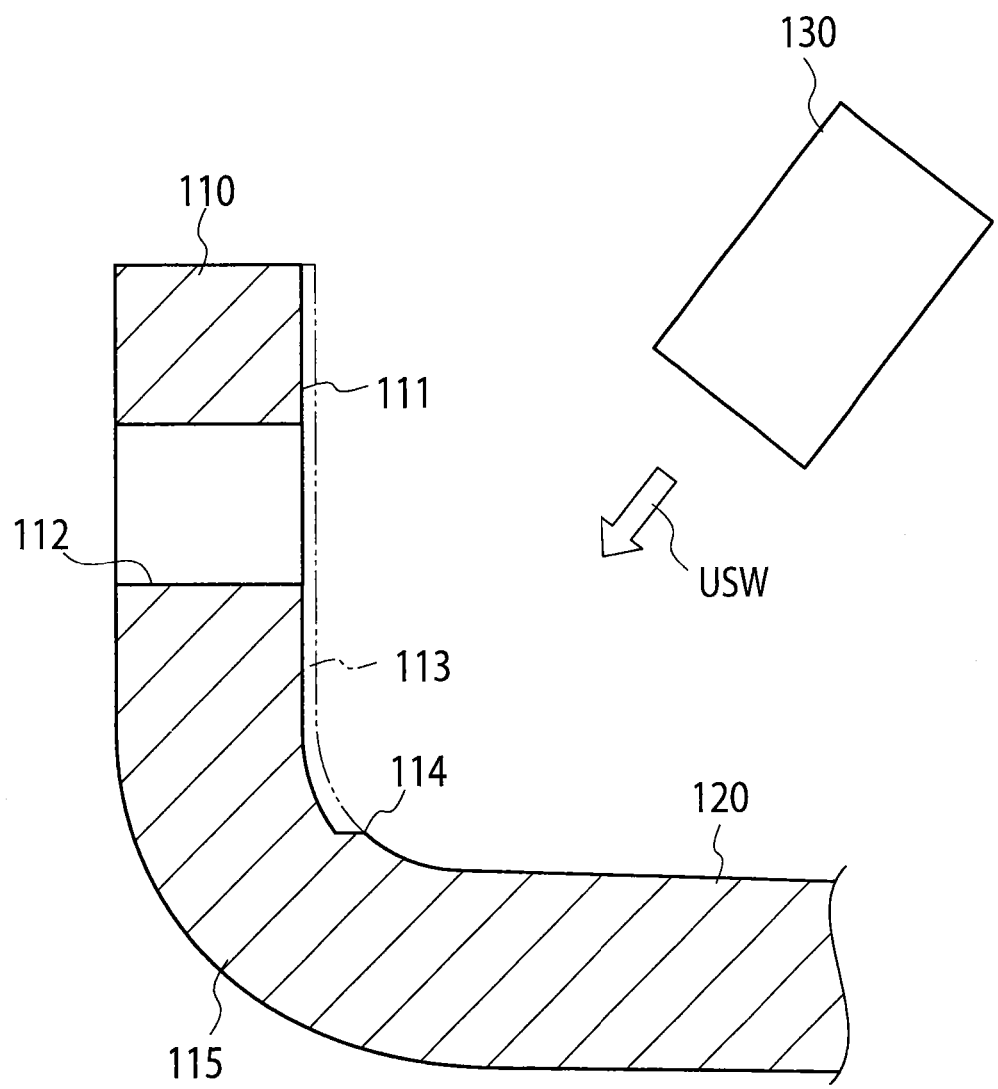
FIG. 4 is a sectional view explaining problems to be solved by the present invention.

Accordingly, the embodiment of the present invention minimizes the occurrence of machined steps at the front and rear parts of the fan case 1, to thereby suppress a disturbance of reflected waves of ultrasonic waves emitted from an ultrasonic transducer (refer to FIG. 4) toward the front bend 19, rear bend 25, and the like and secure a high accuracy for an ultrasonic flaw inspection carried out on the fan case 1.

The embodiment mostly eliminates or minimizes machining processes to be carried out on the case body 13 itself and the like when producing the fan case 1, thereby reducing the ratio of occurrence of defective products and greatly improving the productivity of the fan case 1.

According to the characteristics of the present invention, the additional pad is additionally and integrally formed from the outer surface of the flange opposite to the contacting side of the flange to one end of the outer surface of the part body and the flat fastening seat is formed by machining on the outer surface side of the additional pad. As a result, machining on the part body, flange, and bend themselves is mostly eliminated or minimized when finishing the molded part.

The flat fastening seat is formed by machining on the outer surface side of the additional pad and the area end of the processed area formed by machining is positioned on the part body beyond the bend. As a result, when finishing the molded part into a final shape by machining, the occurrence of machined steps (mismatched patterns) on the molded part is minimized.

The present invention is not limited to the above-mentioned embodiment. For example, the technical idea of the present invention applied to the fan case 1 is applicable to molded parts other than the fan case 1. The present invention allows other proper modifications to be made and are executable in various ways. The scope of rights covered by the present invention is not limited to the embodiment and modifications.

The invention claimed is:

1. A molded part made of a composite material of thermosetting or thermoplastic resin and reinforcing fibers and capable of being fastened to a counterpart with a fastener in a state contacting with the counterpart, comprising:
- a part body;
- a flange integrally formed at least at one end of the part body through a bend, provided with an insertion hole into which the fastener is insertable, and being able to be brought into contact with the counterpart;
- an additional pad additionally and integrally arranged from an outer surface of the flange opposite to a contacting side of the flange to a small-diameter curved surface of the bend and from there to one end of an outer surface of the part body, and provided with a through hole aligning with the insertion hole of the flange to allow an insertion of the fastener; and
- a fastening seat formed by machining on an outer surface side of the additional pad, the fastening seat being able to support part of the fastener, the fastening seat being perpendicular to the outer surface of the part body and being flat, wherein
- an area end of a processed area formed by machining on the additional pad is positioned on the part body beyond the bend,
- the additional pad is a first additional pad and the through hole is a first through hole,
- a second additional pad is additionally and integrally formed on an outer surface of the contacting side of the flange and a second through hole is formed through the second additional pad so that the second through hole aligns with the insertion hole of the flange to allow an insertion of the fastener,
- a flat contacting surface is formed by machining on an outer surface side of the second additional pad, wherein the contacting surface is able to be brought into contact with the counterpart and perpendicular to the outer surface of the part body,
- each of the part body, the flange, and the bend is made of a composite material of thermosetting or thermoplastic resin and carbon fibers, and each of the first additional pad and the second additional pad is made of a composite material of thermosetting or thermoplastic resin and glass fibers.

2. The molded part according to claim 1, wherein
a slope is formed at an end on the part body side of the additional pad and is gradually thinning toward a front end thereof.

3. The molded part according to claim 1, wherein
the molded part is used for an aircraft engine to cover a plurality of fan blades in the aircraft engine; and
the part body is cylindrical and the flange is annular.

* * * * *